US012728894B1

(12) United States Patent
Baxter, III et al.

(10) Patent No.: US 12,728,894 B1
(45) Date of Patent: Sep. 8, 2026

(54) INFERRING FUTURE VISIBILITY TO IMPROVE AUTONOMOUS VEHICLE DRIVING BEHAVIOR AND SAFETY

(71) Applicant: Waymo LLC, Mountain View, CA (US)

(72) Inventors: William V. Baxter, III, Bellevue, WA (US); Kaifei Chen, Santa Clara, CA (US); Mayank Singal, Sunnyvale, CA (US); Andrei Tchouprakov, Mountain View, CA (US); Chenge Yang, Sunnyvale, CA (US); Ming Zou, Mountain View, CA (US)

(73) Assignee: Waymo LLC

( * ) Notice: Subject to any disclaimer, the term of this patent is extended or adjusted under 35 U.S.C. 154(b) by 142 days.

(21) Appl. No.: 18/503,671

(22) Filed: Nov. 7, 2023

(51) Int. Cl.

| | |
|---|---|
| ***B60W 60/00*** | (2020.01) |
| ***B60W 30/095*** | (2012.01) |
| ***B60W 50/00*** | (2006.01) |
| ***G06T 15/06*** | (2011.01) |
| ***G06V 10/25*** | (2022.01) |
| ***G06V 20/58*** | (2022.01) |

(52) U.S. Cl.
CPC .... *B60W 60/0015* (2020.02); *B60W 30/0956* (2013.01); *B60W 50/0097* (2013.01); *G06V 20/58* (2022.01); *B60W 2050/0083* (2013.01); *B60W 2420/403* (2013.01); *B60W 2554/20* (2020.02); *B60W 2556/40* (2020.02); *G06T 15/06* (2013.01); *G06V 10/25* (2022.01)

(58) Field of Classification Search
CPC ......... B60W 60/0015; B60W 30/0956; B60W 50/0097; B60W 2050/0083; B60W 2420/403; B60W 2554/20; B60W 2556/40; G06V 20/58; G06V 10/25; G06T 15/06
See application file for complete search history.

(56) References Cited

U.S. PATENT DOCUMENTS

| | | | | |
|---|---|---|---|---|
| 8,054,201 | B2 * | 11/2011 | Okugi | B60R 1/24 382/104 |
| 8,195,394 | B1 * | 6/2012 | Zhu | G08G 1/09626 382/107 |
| 8,457,827 | B1 * | 6/2013 | Ferguson | B60W 30/095 701/28 |
| 9,760,092 | B2 * | 9/2017 | Ferguson | G05D 1/2437 |
| 11,016,492 | B2 * | 5/2021 | Gier | G06V 20/56 |

(Continued)

*Primary Examiner* — Dale W Hilgendorf
(74) *Attorney, Agent, or Firm* — Van Hoven PC; Jordan Becker

(57) ABSTRACT

A system includes a memory storing instructions and a processing device operatively coupled to the memory, wherein the instructions, when executed by the processing device, cause the processing device to perform operations including obtaining a set of input data representing a set of objects within a driving environment being navigated by an autonomous vehicle (AV), generating, based on the set of input data, future visibility information for a set of future locations along a trajectory of the AV within the driving environment, determining, based on the future visibility information, whether a point of sufficient visibility (PSV) exists among the set of future locations, wherein the PSV is a point determined to be clear of occlusions with respect to a speculative object, and controlling operation of the AV based on the PSV determined to exist among the set of future locations.

20 Claims, 8 Drawing Sheets

(56) References Cited

U.S. PATENT DOCUMENTS 11,126,180 B1 * 9/2021 Kobilarov ....... B60W 30/18163
11,188,082 B2 * 11/2021 Silva .................... G05D 1/0257
11,505,181 B2 * 11/2022 Vladimerou .... B60W 30/18154
2003/0137517 A1 * 7/2003 Kondo .................. G06T 15/205 345/474
2004/0073368 A1 * 4/2004 Gonzalez-Banos .......................... G05D 1/0274 701/301
2007/0003162 A1 * 1/2007 Miyoshi .................. G06T 15/20 382/276
2007/0030212 A1 * 2/2007 Shibata ..................... G06T 5/50 345/9
2007/0053551 A1 * 3/2007 Kubo ...................... G06T 7/269 382/106
2009/0140881 A1 * 6/2009 Sakai ..................... G08G 1/164 340/901
2009/0237269 A1 * 9/2009 Okugi .................... G08G 1/166 340/901
2010/0228482 A1 * 9/2010 Yonak ................. G01S 7/52001 701/301
2011/0090073 A1 * 4/2011 Ozaki .................... G08G 1/167 340/435
2011/0102195 A1 * 5/2011 Kushi .............. G08G 1/096783 340/905
2012/0218125 A1 * 8/2012 Demirdjian ............ G08G 1/164 340/905
2013/0197736 A1 * 8/2013 Zhu ...................... G05D 1/0088 701/26
2013/0245877 A1 * 9/2013 Ferguson ............... G06V 20/56 701/23
2013/0325241 A1 * 12/2013 Lombrozo ............. G01C 21/30 701/23
2020/0225669 A1 * 7/2020 Silva ................. B60W 30/0956
2020/0241530 A1 * 7/2020 Caveney ........... B60W 60/0016
2020/0377092 A1 * 12/2020 Torres .................... G08G 1/166
2021/0149408 A1 * 5/2021 Dodson ................ G05D 1/0221
2021/0405638 A1 * 12/2021 Boyraz .................. G06V 20/64
2022/0063662 A1 * 3/2022 Sprunk .................. G06V 20/58
2022/0097726 A1 * 3/2022 Buchanan ......... B60W 30/0956
2022/0097731 A1 * 3/2022 Xu .................... B60W 30/0956
2022/0185267 A1 * 6/2022 Beller ............... B60W 30/0956
2022/0315051 A1 * 10/2022 Patel ..................... B60W 40/04
2023/0143805 A1 * 5/2023 Baba ................... B60W 30/143 701/301
2024/0087333 A1 * 3/2024 Hari ....................... G06V 10/25
2024/0166197 A1 * 5/2024 Rocchi .............. B60W 30/0956
2024/0190452 A1 * 6/2024 Mirkovic ......... G08G 1/096791
2024/0300486 A1 * 9/2024 Otis ........................ G01S 13/58
2024/0300487 A1 * 9/2024 Otis .................. B60W 30/0956
2024/0300533 A1 * 9/2024 Otis ...................... G01S 17/931

* cited by examiner

INFERRING FUTURE VISIBILITY TO IMPROVE AUTONOMOUS VEHICLE DRIVING BEHAVIOR AND SAFETY

TECHNICAL FIELD

The instant specification generally relates to autonomous vehicles (AVs). More specifically, the instant specification relates to inferring future visibility within driving environments to improve AV driving behavior and safety.

BACKGROUND

An autonomous vehicle (AV) (e.g., at least partially self-driving) operates by sensing a driving environment with various electromagnetic (e.g., radar and optical) and non-electromagnetic (e.g., audio and humidity) sensors. Some autonomous vehicles chart a driving path through the driving environment based on the sensor data. The driving path can be determined based on geolocation data (e.g., Global Positioning System (GPS) data) and road map data. While such data can provide information about permanent aspects of a driving environment (buildings, street layouts, road closures, etc.), information about dynamic or non-permanent aspects of the driving environment (such as information about other vehicles, pedestrians, streetlights, etc.) can be obtained from sensor data. Precision and safety of the driving path and of the speed regime selected by the AV can depend on timely and accurate identification of various objects present in the driving environment, and the ability of the AV to process the information about the driving environment to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
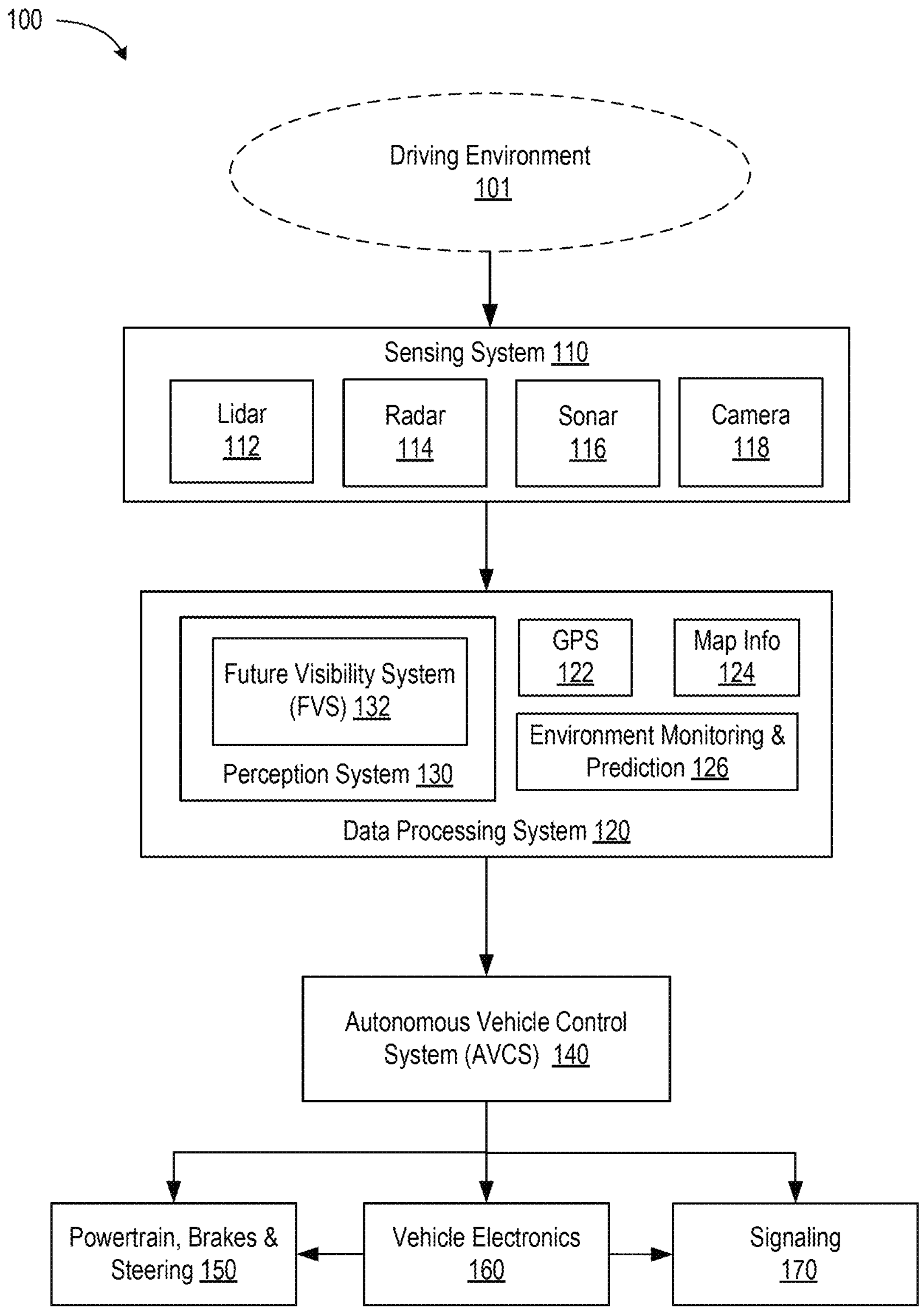
FIG. 1 is a diagram illustrating components of an example autonomous vehicle (AV) that can be used to infer future visibility within driving environments to improve AV driving behavior and safety, in accordance with some implementations of the present disclosure.

In one implementation, disclosed is a system. The system includes a memory storing instructions and a processing device operatively coupled to the memory, wherein the instructions, when executed by the processing device, cause the processing device to perform operations including obtaining a set of input data representing a set of objects within a driving environment being navigated by an autonomous vehicle (AV), generating, based on the set of input data, future visibility information for a set of future locations along a trajectory of the AV within the driving environment, determining, based on the future visibility information, whether a point of sufficient visibility (PSV) exists among the set of future locations, wherein the PSV is a point determined to be clear of occlusions with respect to a speculative object, and controlling operation of the AV based on the PSV determined to exist among the set of future locations.

In another implementation, disclosed is a method. The method includes obtaining, by a processing device, a set of input data representing a set of objects within a driving environment being navigated by an autonomous vehicle (AV), generating, by the processing device based on the set of input data, future visibility information for a set of future locations along a trajectory of the AV within the driving environment, determining, by the processing device based on the future visibility information, whether a point of sufficient visibility (PSV) exists among the set of future locations, wherein the PSV is a point determined to be clear of occlusions with respect to a speculative object, and controlling, by the processing device, operation of the AV based on the PSV determined to exist among the set of future locations.

In another implementation, disclosed is a non-transitory computer-readable storage medium. The non-transitory computer-readable storage medium has instructions stored thereon that, when executed by a processing device, cause the processing device to perform operations including obtaining a set of input data representing a set of objects within a driving environment being navigated by an autonomous vehicle (AV), generating, based on the set of input data, future visibility information for a set of future locations along a trajectory of the AV within the driving environment, determining, based on the future visibility information, whether a point of sufficient visibility (PSV) exists among the set of future locations, wherein the PSV is a point determined to be clear of occlusions with respect to a speculative object, and controlling operation of the AV based on the PSV determined to exist among the set of future locations.

DETAILED DESCRIPTION

An AV can employ one or more sensors to detect distances to various objects in the environment and the velocities of such objects. For example, a radio detection and ranging (radar) sensor can emit one or more radio wave signals (e.g., radio pulses) that travel to an object, and then detect arrived radio wave signals reflected from the object. As another example, a light detection and ranging (lidar) sensor can emit one or more light wave signals (e.g., laser pulses) that travel to an object and can detect arrived light wave signals reflected from the object. By determining a time delay between the signal emission and the arrival of the reflected waves, a sensor can determine the distance to the object.

A sensor can emit signals in one or more directions to obtain a view of the outside driving environment. More specifically, a signal can reflect off an object of the driving environment, and the sensor can determine the presence and distance of an object using the return signal caused by the reflection. In some implementations, an AV can include multiple radar sensors to capture a full 360-degree field-of-view (FOV), and each radar sensor can capture a respective sector of the 360-degree field-of-view (FOV). Each radar sensor can operate concurrently, and frequency-division multiplexing can be used to prevent interference. For example, the AV can include four radar sensors, and each radar sensor can image a 90-degree sector of the FOV. Alternatively, any smaller sector can be scanned, as desired.

Time-of-flight (ToF) sensors can be used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals (frames) can be short enough so that the object does not change its position appreciably in relation to other objects of the environment, but still long enough to allow the radar or lidar to detect accurately the changes in the object's position. Coherent sensors, e.g., frequency-modulated continuous wave (FMCW) radars and/or lidars take advantage of a phase information encoded into transmitted signals (and carried by the emitted electromagnetic waves to the target and back) and provide additional functionality. A coherent sensor detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface that is parallel to the direction of the wave propagation, herein referred to as the "radial" velocity. A coherent sensor allows associating a radial velocity with the return points of the point cloud. This additional information (which can be obtained separately or together with the range information) helps the sensing system of the autonomous vehicle to identify the state of the motion of various objects.

Radar sensors can be inexpensive, can have a large working range of distances, and can possess a good tolerance to adverse driving environment conditions (e.g., foggy, snowy, or misty driving conditions). Because of the relatively low cost and low complexity of radar sensors, multiple radar sensors can be mounted on a vehicle and positioned at locations that collectively provide a 360-degree FOV, as described above. As a result, even when a view from a single lidar sensor mounted in the middle of the roof of a vehicle is obscured by an obstacle (e.g., a doubly parked car or truck), other radar sensors (e.g., mounted on rear-view mirrors) can still provide a good view into the obscured portion of the roadway.

Drivers can make predictions about the state of the driving environment in the (near) future, including future visibility, in order to make safe driving decisions. As used herein, "future visibility" refers to how a driving environment would appear at some short time (e.g., 0.5 second, 1 second, 5 seconds, etc.) within the future. For example, some driving environments have visibility occlusions ("occlusions"). Analyzing the driving environment for occlusions can be used to make decisions to increase safety and decrease the probability of a collision event (e.g., determine where to stop near an intersection to gain maximum visibility to decrease the probability of an accident). Examples of driving scenarios that can have occlusions include intersection scenarios in which a vehicle is approaching an intersection, curved road scenarios in which a vehicle is approaching a curve in a road, and elevation scenarios in which a vehicle is traveling along an uphill portion of a road and is approaching an apex (e.g., locally highest point of the road) before a downhill portion of the road.

In the case of an intersection scenario, one type of driving decision is determining whether to yield to an oncoming vehicle approaching the intersection. Such a driving decision can be made by determining whether the trajectory of the oncoming vehicle has the chance of causing a collision. Another driving decision that can be made in an intersection scenario is determining where to stop near an intersection to achieve maximum visibility to decrease the probability of a collision event. Such driving decisions can be made by analyzing the presence of occlusions within the driving environment around the intersection. Examples of occlusions around the intersection can include objects such as buildings, curbs, parked vehicles, plants, etc.

In the case of a curved road scenario or an elevated road scenario, one type of driving decision is determining an operating speed of the vehicle as it is approaching the curve or the apex, respectively. For example, some curves are so sharp that it may not be possible for a driver to determine whether there is another vehicle ahead of the driver. Additionally, it may not be possible for a driver of a vehicle to determine whether there is a nearby vehicle ahead of the vehicle that is heading on the downhill portion past the apex. Accordingly, curves and apexes can serve as occlusions.

In making such driving decisions described above, a human driver can typically identify a location along a trajectory in which the driver's view is clear of occlusions, such that the driver is confident in continuing along the trajectory (e.g., sufficiently clear of occlusions). The location can be identified along the trajectory by taking into account the current visibility within the driving environment based on the position of occlusions at a current time along the trajectory and/or future visibility within the driving environments based on the position of occlusions at a future time along the trajectory.

In the case of AVs, an AV has a sensor system that can be used by the AV to determine current visibility to identify occlusions within a driving environment at a current time along a trajectory. Due to the many variables that may exist in a driving environment, it can be computationally difficult to implement future visibility functionality within an AV, to enable the AV to determine future visibility to identify occlusions with the driving environment at future times along the trajectory. For example, a driving environment can include a combination of static objects and dynamic objects that change position over time (sometimes unpredictably). Examples of dynamic objects include moving vehicles, pedestrians, etc. Accordingly, an AV may need to rely on different reasoning logic to make future visibility determinations that consider static objects and dynamic objects that may be present within a driving environment.

To address these scenarios, some AVs can implement a yield fence designating a location to which an AV will approach and stop before continuing along a trajectory. For example, a yield fence can be located toward the beginning of an intersection. In some cases, a yield fence is determined by identifying a nearest overlap region predicted to exist between the AV and a speculative object (SO). A SO can refer to a hypothetical object (e.g., another vehicle) that has a trajectory assumed to overlap with the trajectory of the AV. The nearest overlap location can be defined as the nearest location at which the trajectory of the AV and the trajectory of the SO is predicted to intersect at approximately the same time. For example, the nearest overlap location can be a potential vehicle collision location.

In the case of an intersection, determining the yield fence using the nearest overlap region can cause the AV to drive too fast into the intersection and/or too deep into the intersection. Thus, if a real object is perceived by the AV, then the AV may be forced to take a potentially dangerous evasive action. Examples of potentially dangerous evasive actions include hard braking to let the object pass before continuing along the trajectory, or continuing along the trajectory under an assumption that the real object will slow down. Such potentially dangerous evasive actions can negatively impact autonomous driving efficiency and passenger safety and experience. For example, such potentially dangerous evasive actions can increase the likelihood of accidents and/or passenger panic.

Aspects and implementations of the present disclosure address these and other shortcomings of AV technology by implementing systems and methods for inferring future visibility to improve AV driving behavior and safety. A future visibility system described herein can be used to infer future visibility information at future locations along a trajectory being navigated by the AV within a driving environment. Future visibility information can correspond to a time that is later than the current time (e.g., the time at which the inferring is performed) by at least an amount (e.g., 0.5 second, 1 second, 5 seconds, etc.) over which a visible driving environment is likely to change. This amount may be determined using a heuristic or a formula that considers driving conditions (e.g., speed of the AV and/or other objects in the driving environment, distance from the AV to the other objects, etc.), geometry of the roadway (curvature, width of the roadway, grade, etc.), nature of the driving environment (e.g., urban, rural, street, intersection, etc.), and/or other similar factors.

From the future visibility information, a processing device (e.g., onboard or offboard) can determine whether a point of sufficient visibility (PSV) exists among the future locations. A PSV is the first point corresponding to a future location along the trajectory of the AV that is determined to be clear (e.g., sufficiently clear) of occlusions that can pose a risk to the AV. It can be assumed that the PSV is located before a point of the nearest overlap region with respect to the trajectory of the AV (e.g., the AV will reach the PSV before the nearest overlap region). In some implementations, the AV uses the PSV to identify a driving decision based on the PSV, and then perform operations in accordance with the driving decision. For example, an autonomous vehicle control system (AVCS) of the AV can use processed data generated by a data processing system of the AV (e.g., the PSV) to determine the driving decision, and then can cause various components of the AV (e.g., powertrain, brakes, steering, vehicle electronics, signaling, and/or other components) to operate in accordance with the driving decision. Examples of driving decisions include speed, stopping location, etc. For example, in an intersection scenario, the AV can use the PSV to identify the optimal stopping location to achieve sufficient visibility with respect to observing oncoming traffic. As another example, in a curved road or elevation scenario, the AV can use the PSV to identify the optimal speed to achieve sufficient visibility with respect to a potential vehicle ahead of the AV along a curved road or the downward slope of an elevation. Further details regarding inferring future visibility to improve AV driving behavior and safety, including determining whether a PSV along a trajectory of an AV exists and using the PSV to control operations of the AV, will be described in further detail herein below with reference to FIGS. 1-6

Advantages of the described implementations include technical improvements to the operation of an AV. For example, implementations described herein can enable faster, more efficient and more accurate identification of PSVs, which can improve perception performance by the AV perception system and operation performed by the AVCS. Such improvements to the ability of an AV to operate within a driving environment can translate into safer, more comfortable, and more fuel-efficient AV operation.

FIG. 1 is a diagram illustrating components of an example autonomous vehicle (AV) 100, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include at least one radar sensor ("radar") 114, which can be any system that utilizes radio or microwave frequency signals to sense objects within the driving environment 101 of the AV 100. The radar 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include at least one lidar sensor ("lidar") 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include at least one camera sensor ("camera") 118 to capture images of the driving environment 101. The images can be two-dimensional projections of the driving environment 101 (or parts of the driving environment 101) onto a projecting surface (flat or non-flat) of the camera 118. In some implementations, multiple cameras 118 can be mounted on AV 100. Some of the cameras 118 of the sensing system 110 can be video cameras configured to capture a continuous (or quasi-continuous) stream of images of the driving environment 101. The sensing system 110 can also include at least one sonar sensor ("sonar") 116, which can be an ultrasonic sonar, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the camera 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar sensor data in combination with the data captured by the camera 118, as described in more detail below.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data (e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In some implementations, the data processing system 120 further includes a future visibility system (FVS) 132. In this illustrative example, the FVS 132 is included within the perception system 130. However, in other implementations, the FVS 132 can be included within the environment monitoring and prediction component 126.

The FVS 132 can generate future visibility information for a set of future locations along a trajectory being navigated by the AV 100 within the driving environment 101. From the future visibility information, the FVS 132 can determine whether a PSV exists among the future locations. A PSV is the first point corresponding to a future location along the trajectory of the AV that is determined to be clear of occlusions that can pose a risk to the AV 100. It can be assumed that the PSV is located before a point of the nearest overlap region with respect to the trajectory of the AV (e.g., the AV will reach the PSV before the nearest overlap region).

For example, determining whether a PSV along a trajectory of an AV exists can include generating a region of interest (ROI) with respect to at least one viewpoint of the AV 100, identifying a nearest overlap region, and determining (e.g., predicting), for each future location of a set of future locations along the trajectory between the viewpoint and a point of the nearest overlap region, a respective future visibility of a set of future visibilities from the future location to the ROI. That is, each future location can correspond to a future viewpoint of the AV at a respective future time (e.g., timestamp). The FVS 132 can make the determination for multiple different ROIs.

The FSV 132 can determine the set of future visibilities using a set of input data representing objects within the driving environment 101. The set of input data can define a layout of objects within the driving environment 101.

For example, the set of input data can include a permanent object representation of permanent objects within the driving environment 101. A permanent object refers to a static object that, through prior knowledge of the driving environment 101, was known to exist within the driving environment 101 (e.g., a fixture within the driving environment 101). Examples of permanent objects include buildings, curbs, lane dividers, etc. The permanent object representation can be embodied as an object map of permanent objects previously known to exist within the driving environment 101. The permanent object representation can be received by the AV 100 from an external (e.g., offboard) computing device (e.g., server). For example, a scout vehicle can be used to collect data defining the prior knowledge of the driving environment 101, including the permanent objects. In some implementations, a permanent object of the driving environment 101 is represented by a set of surfels, and the permanent object representation is a surface element (surfel) map of permanent objects within the driving environment 101. For example, within a surfel map, a permanent object can be represented by a set of surfels. A surfel is a three-dimensional (3D) computer graphic analog to a voxel ("volume element") or a pixel ("picture element"). Surfels can be taken from surfel tiles within a given radius of the AV 100. In some implementations, the given radius of the AV 100 is about 100 meters (m).

As another example, the set of input data can further include a perception object representation of objects within the driving environment 101. A perception object is an object (e.g., static object) that is perceived or observed by the sensing system 110 and/or the perception system 130 during operation of the AV 100 within the driving environment. One example of a perception object is another vehicle (e.g., parked vehicle), since these vehicles are not permanent fixtures of the driving environment 101. In some implementations, a perception object of the driving environment 101 is represented by a set of triangles. The representation of perception objects with triangles is by example, and it should be understood and appreciated that perception objects can be represented using any suitable shape. For example, a bounding box can be generated for a perception object, and a number of triangles can be generated for each side face of the bounding box. As an illustrative example, if a bounding box has four side faces corresponding to the frontside of a perception object, the backside of the perception object, and the two sides of the perception object, each side face can correspond to two triangles for a total of eight triangles representing the perception object.

The permanent object representation and the perception object representation can each be captured within a respective data structure that can be used to facilitate the future visibility process, as will be described in further detail below. In some implementations, a data structure is a tree structure. For example, the data structure can be a bounding volume hierarchy (BVH) tree. In a BVH tree, geometric objects form the leaf nodes of the tree. One or objects can be grouped together within a bounding volume, which can then be recursively enclosed within one or more larger bounding volumes to form the BVH tree structure with a single bounding volume as a root of the BVH tree. For example, with respect to permanent objects, a tree structure can be a surfel tree structure (e.g., surfel BVH tree structure) with surfel primitives. As another example, with respect to perception objects, a tree structure can be a triangle tree structure (e.g., triangle BVH tree structure) with triangle primitives.

Determining the set of future visibilities can further include the FVS 132 using the set of input data to generate a range image for a viewpoint of the AV 100. The viewpoint of the AV 100 can reflect a current position of the AV 100 (e.g., first timestamp), or a future position of the AV 100 at some time in the future (e.g., second timestamp, third timestamp, . . . ). In some implementations, the range image is a relevant portion of a panoramic range image (e.g., a 360° range image). Generating a portion of the panoramic range image, instead of the entire panoramic range image, can reduce computational resource consumption to make the method implemented by AV 100 more computationally feasible.

In some implementations, generating a range image includes performing raycasting. For example, the viewpoint of the AV 100 can define the origin of a ray to be generated. To generate a range image by performing raycasting, the AV 100 can generate a ray extending from a viewpoint of the AV 100 in the direction of the ROI. The ray can be defined at least in part by its origin corresponding to the viewpoint of the AV 100, and the ray direction corresponding to the direction of the ROI from the viewpoint of the AV 100. The AV 100 can then determine whether the ray is an occluded ray indicative of occlusion of the ROI, with respect to the viewpoint of the AV 100, by an object within the driving environment (e.g., permanent object or perception object). More specifically, an occluded ray can be a ray generated from the viewpoint of the AV 100 in the direction of the ROI that intersects a point (e.g., a surfel corresponding to a permanent object or a triangle corresponding to a perception object) prior to reaching the ROI. The determination can be performed by using the surfel tree structure and/or the triangle tree structure. If the ray is determined to not be an occluded ray (e.g., the closest intersection between the ray and a point occurs behind the ROI), then the ray is determined to be a visible ray that is not indicative of occlusion of the ROI, with respect to the viewpoint of the AV 100, by an object within the driving environment. The AV 100 can repeat the raycasting process by generating multiple rays from the viewpoint of the AV 100 in the direction of the ROI to accumulate visibility information for the ROI with respect to the viewpoint of the AV 100.

In some implementations, at least one operation of the process of generating a range image (e.g., at least one raycasting operation) is performed using at least one graphics processing unit (GPU). For example, the at least one GPU can be used to accelerate processing and/or enable parallel processing of data.

Determining the set of future visibilities can further include the FVS 132 determining whether the ROI is occluded with respect to the viewpoint of the AV 100 based on a number of occluded rays determined to exist for the ROI and the viewpoint. In some implementations, determining whether the ROI is occluded with respect to the viewpoint of the AV 100 includes determining an occlusion ratio for the ROI defined as a ratio of the number occluded rays to the total number of rays generated by the AV 100 for the ROI. For example, an ROI can be determined to be occluded if the occlusion ratio indicates that the majority of the rays generated by the AV 100 are occluded rays (e.g., the number of occluded rays is at least 50% of the total number of rays).

The process described above can be done across multiple different future locations and/or ROIs to obtain a more complete representation of the driving environment 101. Accordingly, the set of future visibilities can include, for various future positions of the AV 100, at least one occluded ROI with respect to at least one future position of the AV 100 and/or at least one non-occluded ROI with respect to at least one future position of the AV 100. Additionally, each visibility query to be processed by the FVS 132 to determine a future visibility between a future location of the AV 100 and an ROI can introduce latency. To reduce the impact of such latency and thus improve computational efficiency, multiple visibility queries can be batched and the FSV 132 can perform batch processing to process the multiple visibility queries. Additionally, multiple visibility queries can be processed in parallel using at least one processing device (e.g., one or more GPUs).

After determining the set of future visibilities, determining whether a PSV along a trajectory of an AV exists can further include the FSV 132 determining whether the set of future locations includes at least one future location having sufficient future visibility from the future location to the ROI. For example, a future location can be determined to have sufficient future visibility based on its corresponding occlusion ratio (e.g., the number of occluded rays is less than 50% of the total number of rays).

If the set of future locations includes at least one future location having sufficient future visibility, then the PSV can be identified by the FVS 132 as the future location of the set of future locations having sufficient future visibility that is nearest to the current location of the AV. Otherwise, if the set of future locations does not include at least one future location having sufficient feature visibility (e.g., the number of occluded rays at each future location is greater than or equal to 50% of the total number of rays), then the PSV can be identified by the FVS 132 as a point of the nearest overlap region.

A PSV, if it exists within the driving environment 101, can be used to improve driving behavior and operation of the AV 100. For example, if a PSV exists, then the PSV can be used by the FSV 132 to define the location of a yield fence for the AV 100. Since the PSV is located before a point of the nearest overlap region, the AV 100 will be able to more safely navigate driving environments in which occlusions can impact visibility, such as intersections, curved roads, hills, etc. Otherwise, if a PSV does not exist, then the yield fence can be placed at a point of the overlap region by default.

Additionally or alternatively, in some implementations, the PSV is used to determine at least one metric related to the PSV. For example, a metric related to the PSV can be a distance to the PSV. The distance to the PSV can be defined as the distance between a current reference point of the AV 100 (e.g., location of a sensor of the AV 100) and the PSV. As another example, a metric related to the PSV can be a time to the PSV. The time to the PSV refers to the amount of time it takes for the AV 100 to reach the PSV. In some implementations, the time to the PSV is proportional to a time ratio defined as a ratio of distance between the AV 100 and the PSV, and the current speed of the AV 100. For example, the time to the PSV can be equal to the time ratio plus a delay factor (e.g., perception delay factor). The delay factor can be used to increase safety. The time to the PSV can be used to determine a sampling interval for visibility queries based on the current speed of the AV 100. For example, the sampling interval can be proportional to the product of the time to the PSV and the current speed of the AV 100. Thus, by affecting the sampling interval, the time to the PSV can be used to control operation of the AV (slow down, yield, etc.) The time to the PSV determined herein can be more accurate as compared to heuristic approaches of calculating times that can overestimate for safety reasons. Accordingly, the use of the time to the PSV can reduce the occurrence of negative AV driving behaviors such as excessive slow down and/or under-yielding.

The AVCS 140 can use data received from the data processing system 120, including the PSV, to cause various components of the AV, such as powertrain, brakes & steering 150, vehicle electronics 160, signaling 170, etc., to operate in accordance with a driving decision. Examples of driving decisions include speed, stopping location, etc. For example, in an intersection scenario, the AV can use the PSV to identify the optimal stopping location to achieve sufficient visibility with respect to observing oncoming traffic (e.g., use the PSV, the time to the PSV and/or the distance to the PSV). As another example, in a curved road or elevation scenario, the AV can use the PSV to identify the optimal speed to achieve sufficient visibility with respect to a potential vehicle ahead of the AV along a curved road or the downward slope of an elevation (e.g., use the PSV, the time to the PSV and/or the distance to the PSV). Further details regarding operations performed by the AV 100 to infer future visibility to improve driving behavior and safety will now be described below with reference to FIGS. 2A-4.

Figure 2A:
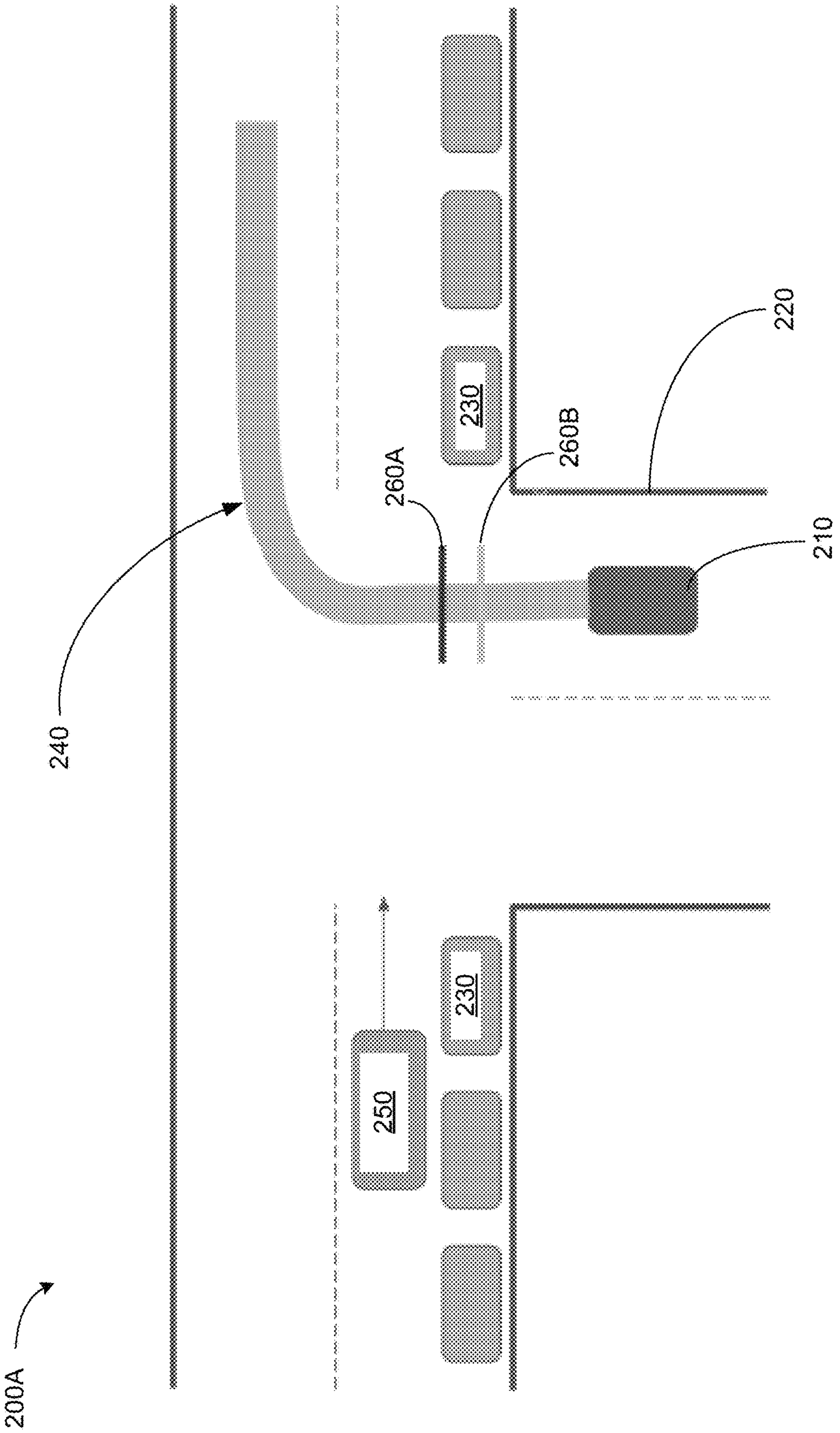
FIGS. 2A-4 are diagrams illustrating examples of inferring future visibility within driving environments to improve autonomous vehicle (AV) driving behavior and safety, in accordance with some implementations of the present disclosure.

FIG. 2A is a diagram 200A illustrating an example of inferring future visibility within driving environments to improve AV driving behavior and safety, in accordance with some implementations of the present disclosure. More specifically, diagram 200A illustrates an example intersection scenario within a driving environment (e.g., driving environment 101). Diagram 200A shows an AV 210 (e.g., AV 100), and static objects including curb 220 and parked vehicles 230. For example, the curb 220 can be a permanent object and the parked vehicles 230 can be perception objects. Diagram 200A further shows, a trajectory 240 of the AV 210 through the intersection (in this example, a right hand turn). Parked vehicles 230 can occlude the view of the AV 210 with respect to a speculative object (SO) 250.

Diagram 200A further shows a line 260A representing a location of a first overlap and a line 260B representing a location of a point of sufficient visibility (PSV) determined (e.g., predicted) by the AV 210. More specifically, the location of the first overlap is a location where the trajectory 240 of the AV 210 is determined to intersect with the trajectory of the SO 250 (e.g., potential collision with the SO 250). The PSV can be determined by the AV 210 (e.g., the FSV 132 of FIG. 1) as described above with reference to FIG. 1 and as will be described in further detail below with reference to FIGS. 2B-4. In this example, since the location of the PSV is behind the location of the first overlap, the line 260B can replace the line 260A as the boundary where the AV 210 should stop and/or yield before continuing on the trajectory 240. If the location of the PSV is at the location of the first overlap or beyond the location of the first overlap, or if a PSV is not determined by the AV 210, then the line 260A can be set as a default boundary where the AV 210 should stop and/or yield before continuing on the trajectory 240 (e.g., a worst case scenario).

Figure 2B:
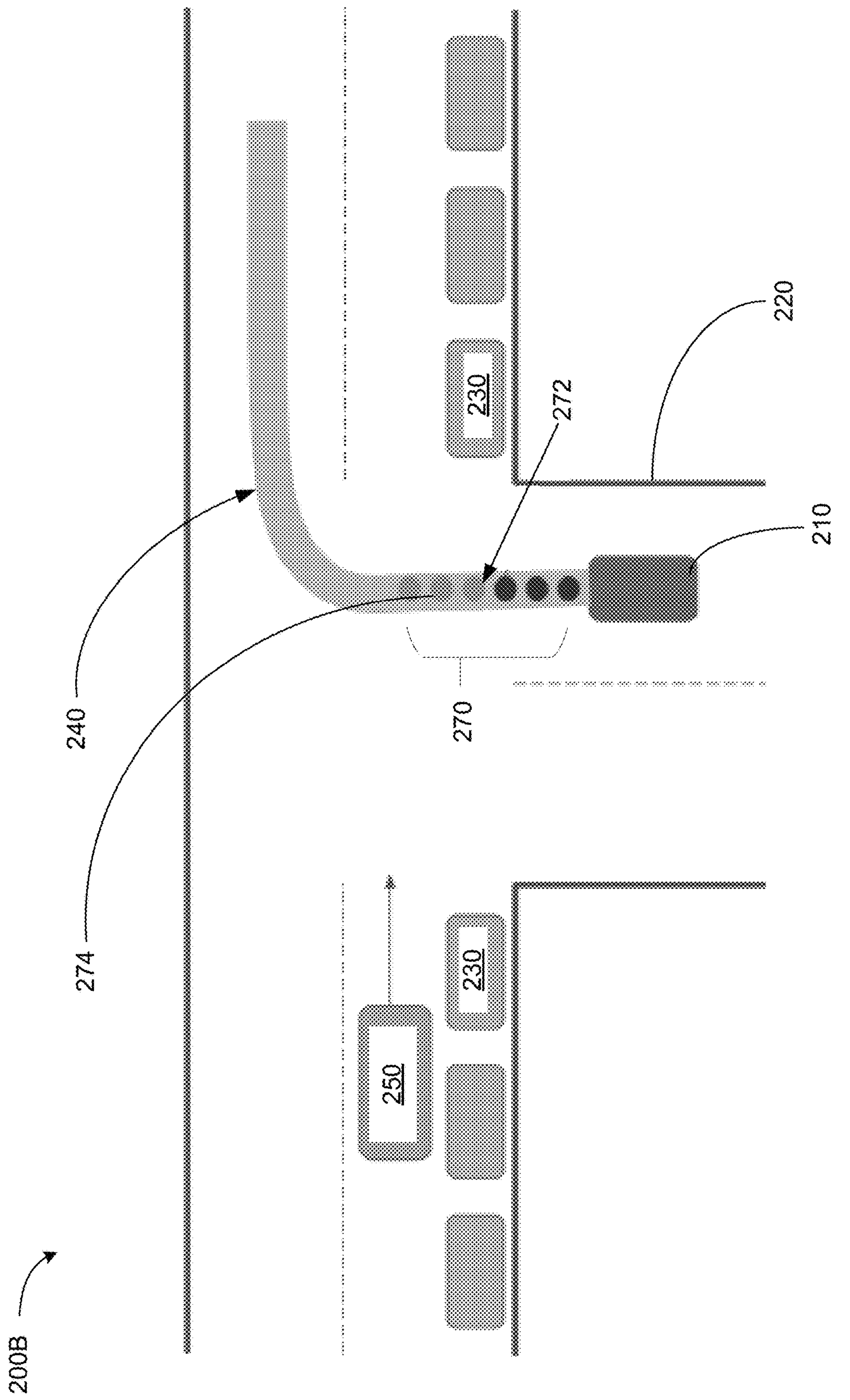

FIG. 2B is a diagram 200B illustrating an example of inferring future visibility within driving environments to improve AV driving behavior and safety, in accordance with some implementations of the present disclosure. Diagram 200B includes components 210-250, similar to components 210-250 described in further detail above with reference to FIG. 2A.

Diagram 200B further shows a set of points (e.g., sample points) 270 along the trajectory 240. More specifically, each point of the set of points 270 corresponds to a future location along the trajectory 240 from which future visibility can be inferred by AV 210, as described above with reference to FIG. 1 and as will be described in further detail below with reference to FIGS. 2B-4. In some implementations, for each point of the set of points 270, a respective set of states for the corresponding future location can be determined. The set of states for a future location can include a future visibility state and a trajectory visibility state. The future visibility state can include a future visibility prediction for a ROI inferred by the AV 210 (e.g., the FSV 132 of FIG. 1) and a current visibility state of the driving environment identified by the AV 210. The state information can further include occlusion reasoning data, which can include future SOs, travel times, etc. In this illustrative example, point 272 can correspond to the PSV (e.g., line 260B of FIG. 2A) and point 274 can correspond to the first overlap (e.g., line 260A of FIG. 2A).

Figure 3:
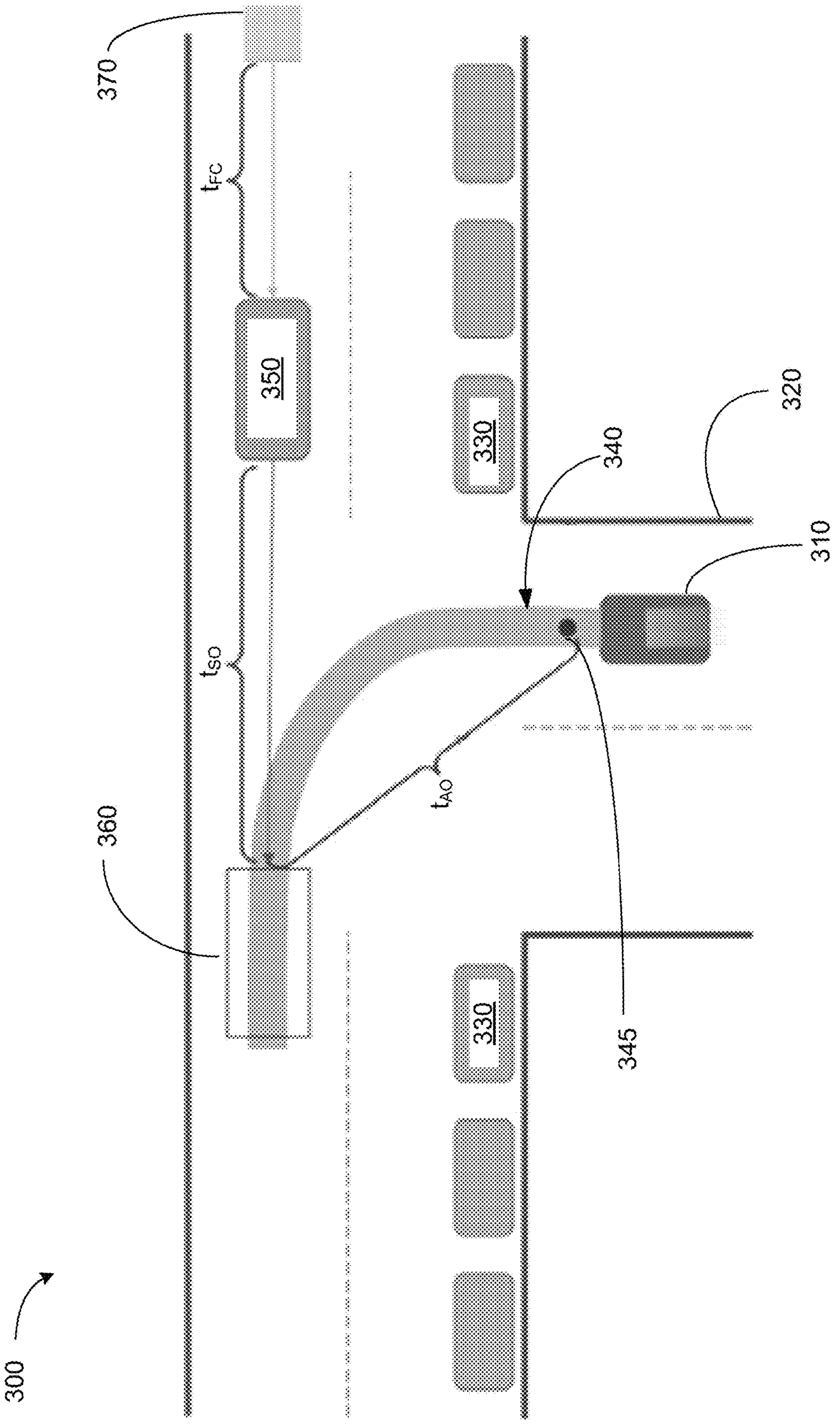

FIG. 3 is a diagram 300 illustrating an example of determining an ROI for inferring future visibility within driving environments to improve AV driving behavior and safety, in accordance with some implementations of the present disclosure. More specifically, diagram 300 illustrates an example intersection scenario within a driving environment (e.g., driving environment 101).

Diagram 300 shows an AV 310 (e.g., AV 100 of FIG. 1), and static objects including curb 320 and parked vehicles 330, similar to components 210-230 of FIGS. 2A-2B. Diagram 300 further shows a trajectory 340 of the AV 310 through the intersection (in this example, a left hand turn). Parked vehicles 330 can occlude the view of the AV 310 with respect to a current speculative object (SO) 350. Diagram 300 further shows overlap region 360 corresponding a region where the trajectory 340 and the trajectory of the current SO 350 overlaps (e.g., potential collision). Diagram 300 further shows a point 345 corresponding to a future location along the trajectory 340. A time of the AV 310 from the point 345 to the overlap region 360 is shown as "$t_{AO}$". A time of the current SO 350 to the overlap region 360 is shown as "$t_{SO}$". Diagram 300 further shows a ROI 370. The ROI 370 can correspond to a future SO. A time of the future SO defined by the ROI 370 to the current SO 350 is shown as "$t_{FC}$". The location of ROI 370, which can be used to determine the PSV, can be determined from at least one of: current SO 350, overlap region 360, $t_{AO}$, $t_{SO}$ and/or $t_{FC}$.

Figure 4:
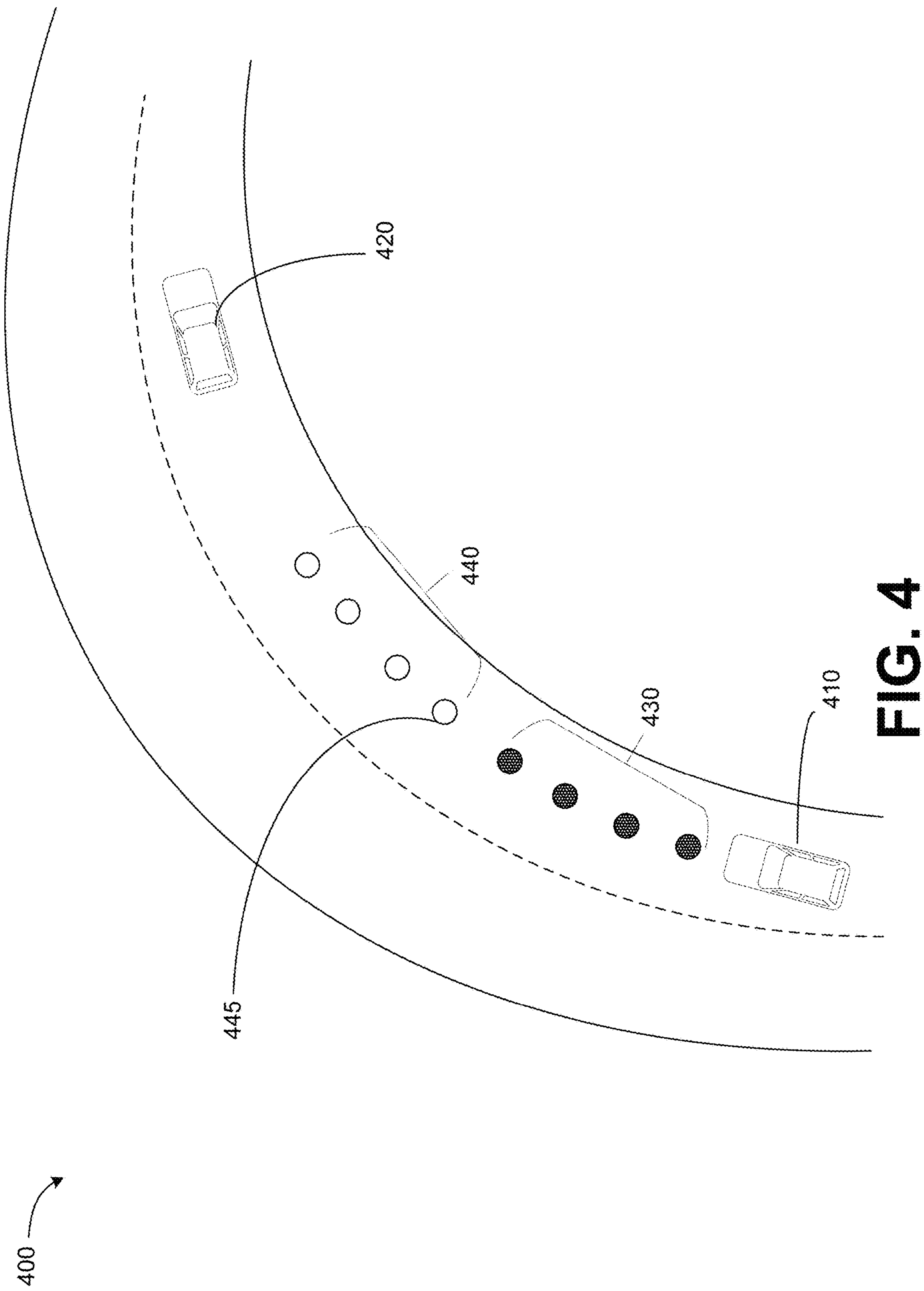

FIG. 4 is a diagram 400 illustrating an example of inferring future visibility within driving environments to improve AV driving behavior and safety, in accordance with some implementations of the present disclosure. More specifically, diagram 400 illustrates an example curved road scenario within a driving environment (e.g., driving environment 101).

Diagram 400 shows an AV 410 (e.g., AV 100 of FIG. 1) and speculative object (SO) 420. The SO 420 in this illustrative example can be referred to as a "lead SO" as it is ahead of the AV 410. At a current location of the AV 410, the curved road is occluding the view of the AV 410 with respect to the SO 420. Diagram 400 further shows a set of points 430 and a set of points 440. Each point of the set of points 430 and the set of points 440 corresponds to a future location along a trajectory of the AV 410 along the curved road. More specifically, each point of the set of points 430 corresponds to a future location along the trajectory that is determined to lack visibility (e.g., sufficient visibility) to the SO 420. Each point of the set of points 440 corresponds to a future location along the trajectory that is determined to have visibility (e.g., sufficient visibility) to the SO 420. A PSV 445 is identified from the set of points 440, as an initial (e.g., temporally and/or locationally first) point of the set of points 440. The PSV 445 can then be used to control operation of the AV 410, as described above with reference to FIG. 1 and as will be described herein further detail below with reference to FIGS. 5A-5B.

Figure 5A:
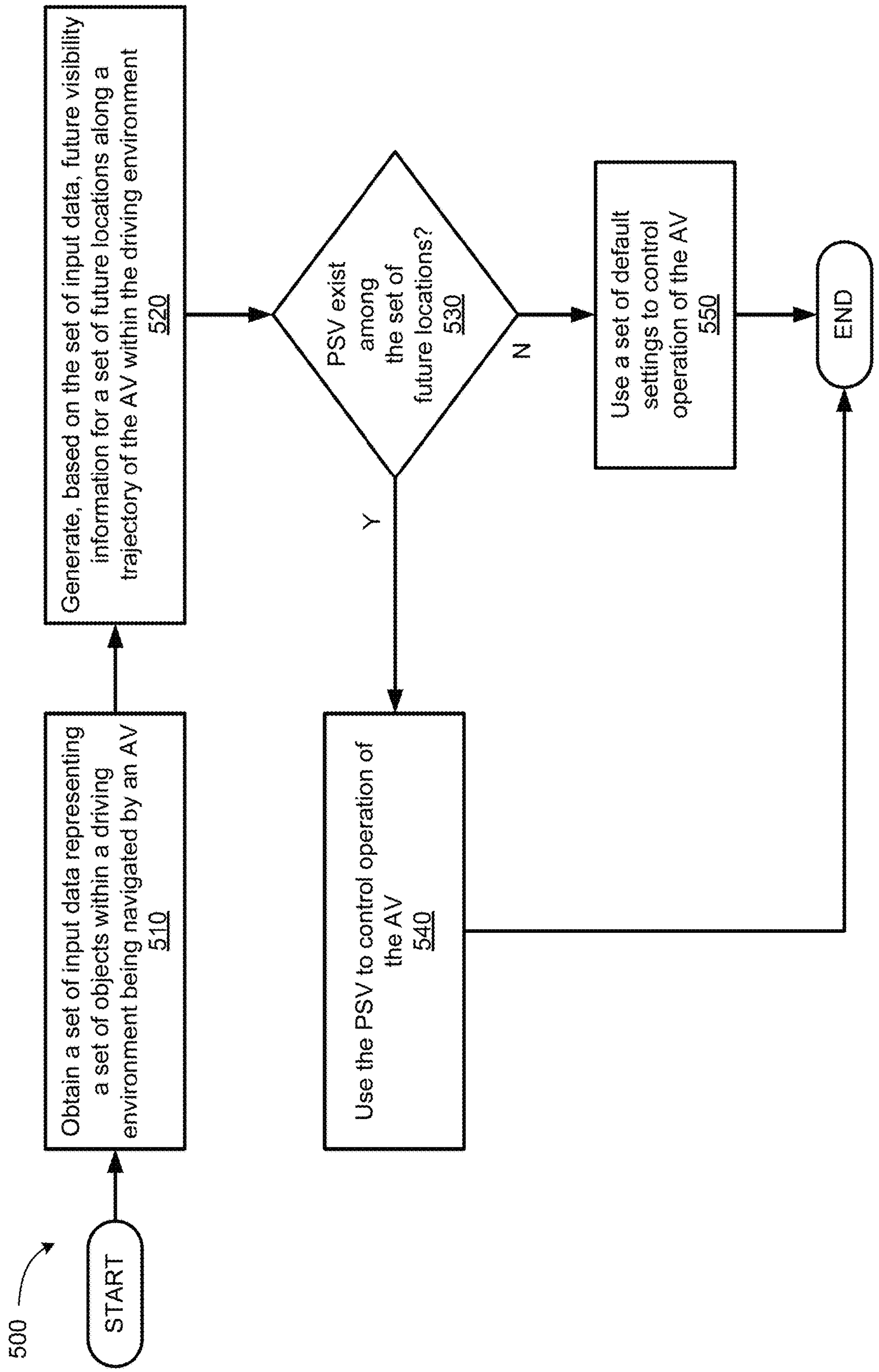
FIGS. 5A-5B are flowcharts illustrating example methods of inferring future visibility within driving environments to improve autonomous vehicle (AV) driving behavior and safety, in accordance with some implementations of the present disclosure.

FIG. 5A is flowchart illustrating an example method 500 of inferring future visibility to improve autonomous vehicle (AV) driving behavior and safety, in accordance with some implementations of the present disclosure. A processing device, having one or more processing units (CPUs), and or graphics processing units (GPU) and memory devices communicatively coupled to the CPU(s) and/or GPUs, can perform method 500 and/or each of its individual functions, routines, subroutines, or operations. The processing device executing method 500 can perform instructions issued by various components of the data processing system 120 of FIG. 1 (e.g., FVS 132). Method 500 can be directed to systems and components of an autonomous driving vehicle, such as the AV 100 of FIG. 1. Method 500 can be used to improve performance of the data processing system 120 and/or the AVCS 140 of FIG. 1. In certain implementations, a single processing thread can perform method 500. Alternatively, two or more processing threads can perform method 500, each thread executing one or more individual functions, routines, subroutines, or operations of the methods. In an illustrative example, the processing threads implementing method 500 can be synchronized (e.g., using semaphores, critical sections, and/or other thread synchronization mechanisms). Alternatively, the processing threads implementing method 500 can be executed asynchronously with respect to each other. Various operations of method 500 can be performed in a different order compared with the order shown in FIG. 5A. Some operations of method 500 can be performed concurrently with other operations. Some operations can be optional.

At operation 510, processing logic can obtain a set of input data representing a set of objects within a driving environment being navigated by an AV. In some implementations, the set of objects includes a set of permanent objects within the driving environment. In some implementations, the set of objects includes a set of perception objects observed by the AV within the driving environment. In some implementations, obtaining the set of input data includes obtaining a surfel map corresponding to the set of permanent objects. In some implementations, a perception object of the driving environment 101 is represented by a set of triangles.

The representation of perception objects with triangles is by example, and it should be understood and appreciated that perception objects can be represented using any suitable shape. For example, a bounding box can be generated for a perception object, and a number of triangles can be generated for each side face of the bounding box. As an illustrative example, if a bounding box has four side faces corresponding to the frontside of a perception object, the backside of the perception object, and the two sides of the perception object, each side face can correspond to two triangles for a total of eight triangles representing the perception object.

The permanent object representation and the perception object representation can each be captured within a respective data structure that can be used to facilitate the future visibility process, as will be described in further detail below. In some implementations, a data structure is a tree structure. For example, the data structure can be a BVH tree. For example, with respect to permanent objects, a tree structure can be a surfel tree structure (e.g., surfel BVH tree structure) with surfel primitives. As another example, with respect to perception objects, a tree structure can be a triangle tree structure (e.g., triangle BVH tree structure) with triangle primitives.

At operation 520, processing logic can generate, based on the set of input data, future visibility information for a set of future locations along a trajectory of the AV within the driving environment.

At operation 530, processing logic determines whether a PSV exists among the set of future locations based on the future visibility information. For example, determining whether the PSV exists can include generating a range image for a viewpoint of the AV. More specifically, the range image can be generated by analyzing occlusions that are determined to exist between the viewpoint of the AV and at least one ROI. An example of a method for determining whether a PSV exists among the set of future locations based on the future visibility information will be described in further detail below with reference to FIG. 5B.

At operation 540, if a PSV is determined to exist among the set of future locations, then processing logic can use the PSV to control operation of the AV. In some implementations, using the PSV to control operation of the AV can include setting a yield location (e.g., yield fence) for the AV based on the PSV. For example, the yield location can replace the default yield location. Illustratively, in an intersection scenario, the yield location can replace a default yield location defined based on an overlap region between the AV along the trajectory and the trajectory of a speculative object (SO).

In some implementations, using the PSV to control operation of the AV can include determining at least one metric related to the PSV. The at least one metric related to the PSV can be used by the AVCS to control operation of the AV. For example, the at least one metric related to the PSV can include at least one of a distance to the PSV or a time to the PSV. In some implementations, the time to the PSV is proportional to a time ratio defined as a ratio of distance between the AV and the PSV, and the current speed of the AV. For example, the time to the PSV can be equal to the time ratio plus a delay factor (e.g., perception delay factor). The delay factor can be used to increase safety. The time to the PSV can be used to determine a sampling interval for visibility queries based on the current speed of the AV. For example, the sampling interval can be proportional to the product of the time to the PSV and the current speed of the AV. Thus, by affecting the sampling interval, the time to the PSV can be used to control operation of the AV (slow down, yield, etc.).

A PSV, if determined to exist, can be used to improve driving behavior and operation of the AV. For example, if a PSV exists, then the PSV can be used to define the location of a yield fence for the AV. Since the PSV is located before a point of the nearest overlap region, the AV will be able to more safely navigate driving environments in which occlusions can impact visibility, such as intersections, curved roads, hills, etc. As another example, the time to the PSV can reduce the occurrence of negative AV driving behaviors such as excessive slow down and/or under-yielding At operation 550, if a PSV is not determined to exist among the set of future locations, then processing logic can use a set of default settings to control operation of the AV. For example, the set of default settings can include at least one of the default yield location, the distance to the default yield location, or the time to the default yield location. For example, if a PSV does not exist, then the yield fence can be placed at a point of the overlap region by default. Further details regarding operations 510-550 are described above with reference to FIGS. 1-4 and will now be described in further detail below with reference to FIG. 5B.

Figure 5B:
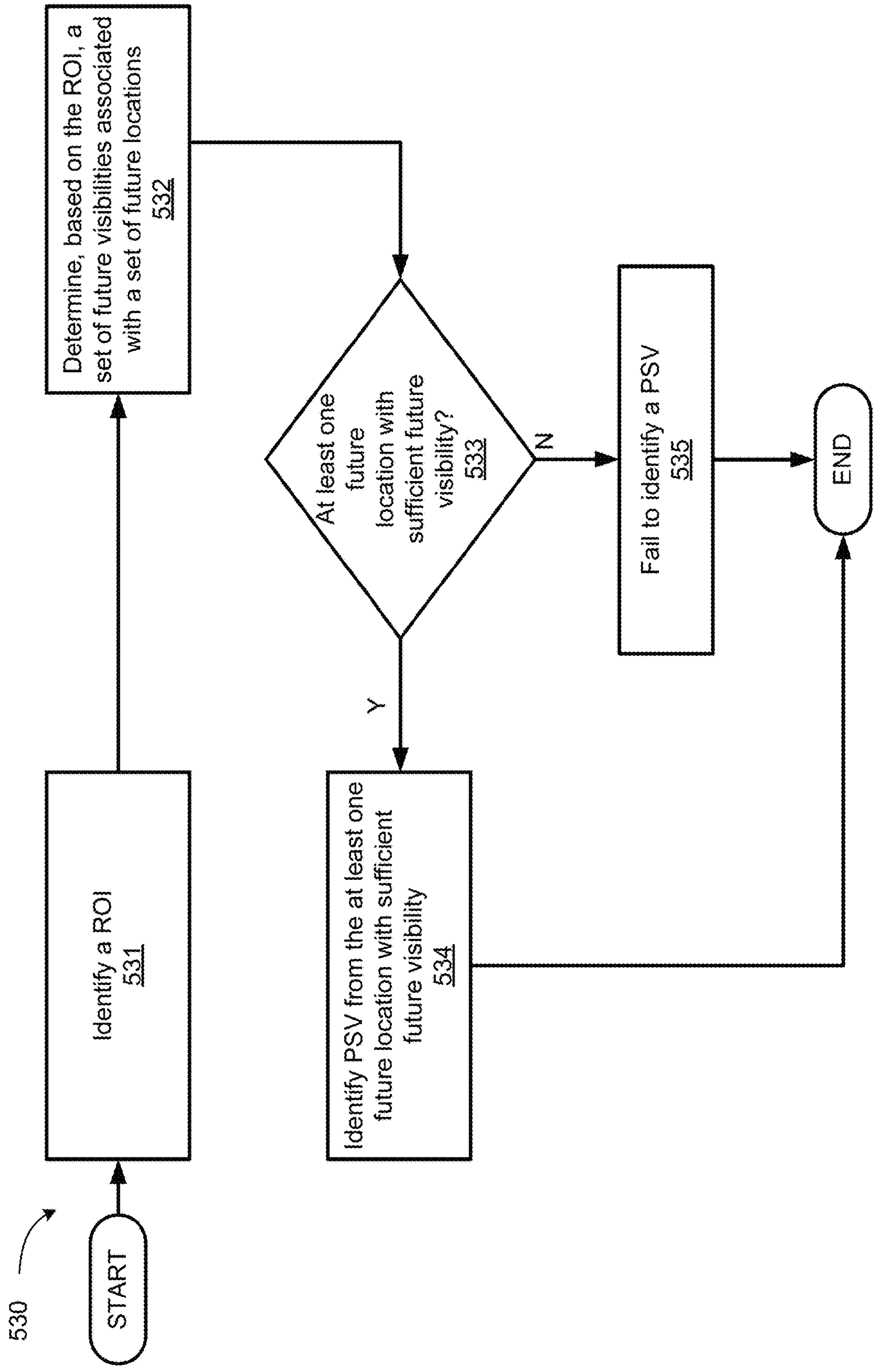

FIG. 5B is flowchart illustrating an example method 530 of determining whether a PSV exists among a set of future locations, in accordance with some implementations of the present disclosure. A processing device, having one or more processing units (CPUs), and or graphics processing units (GPU) and memory devices communicatively coupled to the CPU(s) and/or GPUs, can perform method 530 and/or each of its individual functions, routines, subroutines, or operations. The processing device executing method 530 can perform instructions issued by various components of the data processing system 120 of FIG. 1 (e.g., FVS 132). Method 530 can be directed to systems and components of an autonomous driving vehicle, such as the AV 100 of FIG. 1. Method 500 can be used to improve performance of the data processing system 120 and/or the AVCS 140 of FIG. 1. In certain implementations, a single processing thread can perform method 530. Alternatively, two or more processing threads can perform method 530, each thread executing one or more individual functions, routines, subroutines, or operations of the methods. In an illustrative example, the processing threads implementing method 530 can be synchronized (e.g., using semaphores, critical sections, and/or other thread synchronization mechanisms). Alternatively, the processing threads implementing method 530 can be executed asynchronously with respect to each other. Various operations of method 530 can be performed in a different order compared with the order shown in FIG. 5B. Some operations of method 530 can be performed concurrently with other operations. Some operations can be optional.

At operation 531, processing logic identifies a ROI along a trajectory of an AV within a driving environment. More specifically, the ROI can be identified (e.g., generated) with respect to a viewpoint of an AV within a driving environment. In some implementations, identifying the ROI includes identifying a nearest overlap region. The nearest overlap region can be identified as a region where the trajectory of the AV is determined to intersect with a trajectory of a SO (e.g., potential collision with the SO).

At operation 532, processing logic determines, based on the ROI, a set of future visibilities associated with a set of future locations. More specifically, for each future location of the set of future locations, a respective future visibility of the set of future visibilities can be determined for the future location.

Determining the set of future visibilities can further include using the set of input data to generate a range image for a viewpoint of the AV. In some implementations, the range image is a relevant portion of a panoramic range image (e.g., a 360° range image). Generating a portion of the panoramic range image, instead of the entire panoramic range image, can reduce computational resource consumption to make the method implemented by AV 100 more computationally feasible.

In some implementations, generating a range image includes performing raycasting. For example, the viewpoint of the AV can define the origin of a ray to be generated. To generate a range image by performing raycasting, processing logic can generate a ray extending from a viewpoint of the AV in the direction of the ROI. The ray can be defined at least in part by its origin corresponding to the viewpoint of the AV, and the ray direction corresponding to the direction of the ROI from the viewpoint of the AV. Processing logic can then determine whether the ray is an occluded ray indicative of occlusion of the ROI, with respect to the viewpoint of the AV, by an object within the driving environment (e.g., permanent object or perception object). More specifically, an occluded ray can be a ray generated from the viewpoint of the AV in the direction of the ROI that intersects a point (e.g., a surfel corresponding to a permanent object or a triangle corresponding to a perception object) prior to reaching the ROI. The determination can be performed by using the surfel tree structure and/or the triangle tree structure. If the ray is determined to not be an occluded ray (e.g., the closest intersection between the ray and a point occurs behind the ROI), then the ray is determined to be a visible ray that is not indicative of occlusion of the ROI, with respect to the viewpoint of the AV, by an object within the driving environment. Processing logic can repeat the raycasting process by generating multiple rays from the viewpoint of the AV in the direction of the ROI to accumulate visibility information for the ROI with respect to the viewpoint of the AV. In some implementations, at least one operation of the process of generating a range image (e.g., at least one raycasting operation) is performed using at least one GPU.

Determining the set of future visibilities can further include determining whether the ROI is occluded with respect to the viewpoint of the AV based on a number of occluded rays determined to exist for the ROI and the viewpoint. In some implementations, determining whether the ROI is occluded with respect to the viewpoint of the AV includes determining an occlusion ratio for the ROI defined as a ratio of the number occluded rays to the total number of rays generated by the AV for the ROI. For example, an ROI can be determined to be occluded if the occlusion ratio indicates that the majority of the rays generated by the AV are occluded rays (e.g., the number of occluded rays is at least 50% of the total number of rays).

The process described above can be done across multiple different future locations and/or ROIs to obtain a more complete representation of the driving environment. Accordingly, the set of future visibilities can include, for various future positions of the AV, at least one occluded ROI with respect to at least one future position of the AV and/or at least one non-occluded ROI with respect to at least one future position of the AV. Additionally, each visibility query to be processed to determine a future visibility between a future location of the AV and an ROI can introduce latency. To reduce the impact of such latency and thus improve computational efficiency, multiple visibility queries can be batched and batch processing can be performed to process the multiple visibility queries. Additionally, multiple visibility queries can be processed in parallel using at least one processing device (e.g., one or more GPUs)

At operation 533, processing logic determines whether at least one future location of the set of future locations has sufficient future visibility. For example, a future location can be determined to have sufficient future visibility based on its corresponding occlusion ratio (e.g., the number of occluded rays is less than 50% of the total number of rays).

At operation 534, if processing logic determines that at least one future location of the set of future locations has sufficient future visibility, then processing logic can identify a PSV from the at least one future location with sufficient future visibility. The PSV can then be used to control operation of the AV, as described in further detail above with reference to FIGS. 1-5A.

At operation 535, if processing logic determines that the set of future locations does not include a future location having sufficient visibility, then processing logic can fail to identify a PSV. A default point can be used to control operation of the AV (e.g., a point of the nearest overlap region), as described in further detail above with reference to FIGS. 1-5A. Further details regarding operations 531-535 are described above with reference to FIGS. 1-5A.

Figure 6:
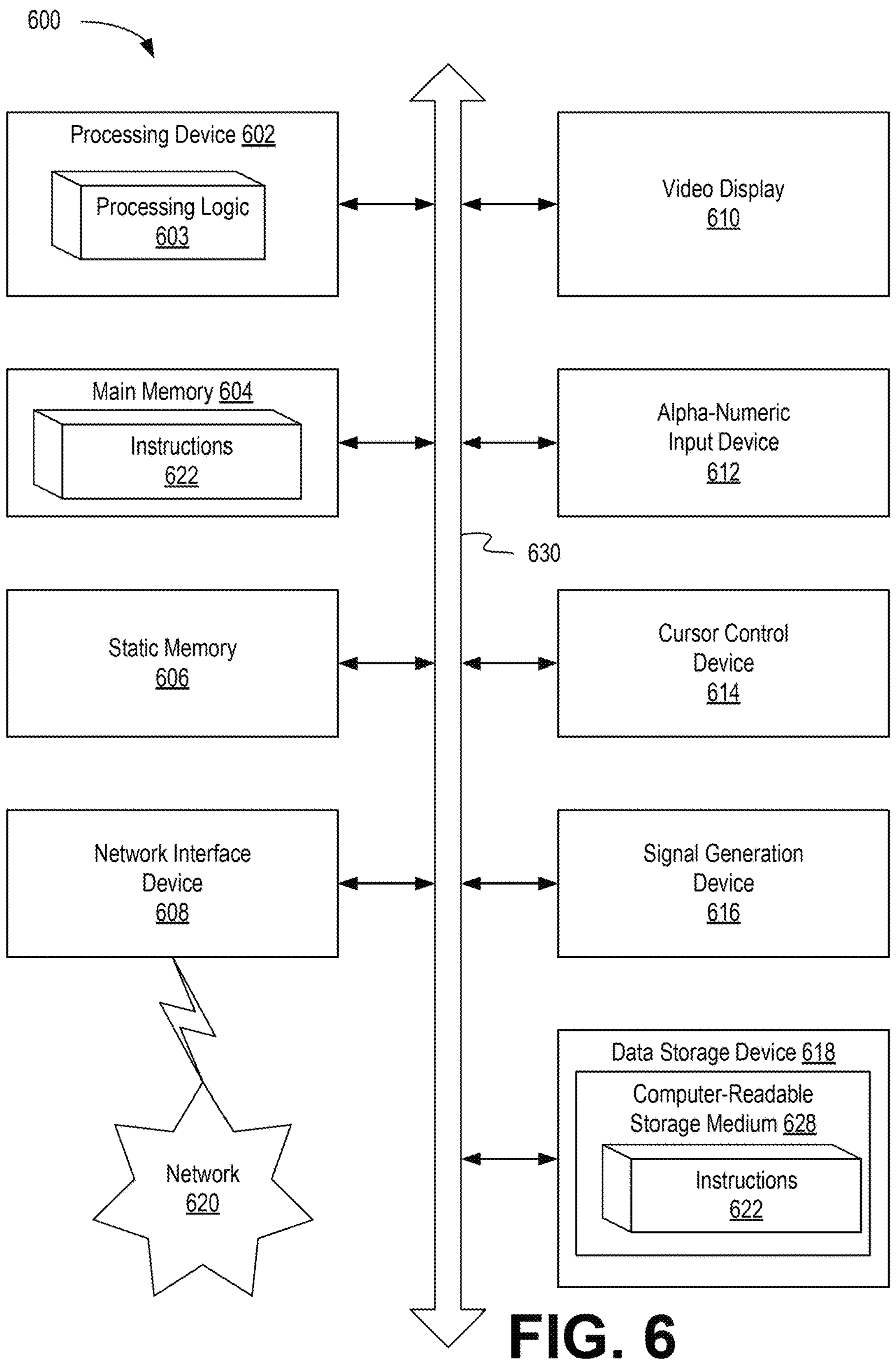
FIG. 6 is a block diagram of an example computer device, in accordance with some implementations of the present disclosure.

FIG. 6 depicts a block diagram of an example computer device 600 capable of enabling fast and reliable object identification and tracking in autonomous driving environments, in accordance with some implementations of the present disclosure, in accordance with some implementations of the present disclosure. Example computer device 600 can be connected to other computer devices in a LAN, an intranet, an extranet, and/or the Internet. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 (which can include processing logic 603) represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 can be configured to execute instructions performing method of validating occlusions observed in autonomous vehicle (AV) driving environments (e.g., method 500 of FIGS. 5A-5B).

Example computer device 600 can further comprise a network interface device 608, which can be communicatively coupled to a network 620. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium (or, more specifically, a non-transitory computer-readable storage medium) 628 on which is stored one or more sets of executable instructions 622. In accordance with one or more aspects of the present disclosure, executable instructions 622 can comprise executable instructions for performing a method of validating occlusions observed in AV driving environments (e.g., method 500 of FIGS. 5A-5B).

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "obtaining," "identifying," "determining," "removing," "causing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:

a memory storing instructions; and a hardware processor operatively coupled to the memory, wherein the instructions, when executed by the hardware processor, cause the hardware processor to perform operations comprising:

obtaining a set of input data representing a set of objects within a driving environment being navigated by an autonomous vehicle (AV), the set of input data being associated with a first time;

generating, based on the set of input data associated with the first time, future visibility information for a plurality of future locations along a trajectory of the AV within the driving environment, wherein the future visibility information for each future location of the plurality of future locations corresponds to a second time during which visibility of the driving environment is likely to change, and wherein the second time for each future location is a respective amount of time later than the first time;

determining, based on the future visibility information, whether a point of sufficient visibility (PSV) exists among the plurality of future locations, wherein the PSV is identified, from among the plurality of future locations, as a first future location along the trajectory of the AV that is determined to be clear of occlusions with respect to a speculative object; and controlling operation of the AV based on the PSV determined to exist among the plurality of future locations.

2. The system of claim 1, wherein the set of objects comprises a set of permanent objects within the driving environment and a set of perception objects observed by the AV within the driving environment.

3. The system of claim 2, wherein obtaining the set of input data comprises obtaining a surfel map corresponding to the set of permanent objects.

4. The system of claim 1, wherein determining, based on the future visibility information, whether the PSV exists among the plurality of future locations further comprises:

identifying a region of interest (ROI) with respect to a viewpoint of the AV;

determining, based on the ROI, a set of future visibilities associated with the plurality of future locations, wherein each future location of the plurality of future locations corresponds to a respective future visibility of the set of future visibilities; and determining whether the PSV exists within the plurality of future locations based on the set of future visibilities.

5. The system of claim 4, wherein determining the set of future visibilities further comprises determining, for each future location of the plurality of future locations, whether the ROI is occluded using raycasting by:

identifying a number of occluded rays that exist with respect to the ROI;

determining whether the number of occluded rays satisfies a threshold condition; and in response to determining that the number of occluded rays satisfies the threshold condition, identifying the ROI as being occluded.

6. The system of claim 1, wherein controlling operation of the AV based on the PSV further comprises identifying at least one of: a yield location, a distance to the PSV, or a time to the PSV.

7. The system of claim 1, wherein the operations further comprise, in response to determining that the PSV does not exist among the plurality of future locations, using a set of default settings to control operation of the AV.

8. A method comprising:

obtaining, by a hardware processor, a set of input data representing a set of objects within a driving environment being navigated by an autonomous vehicle (AV), the set of input data being associated with a first time;

generating, by the hardware processor based on the set of input data associated with the first time, future visibility information for a plurality of future locations along a trajectory of the AV within the driving environment, wherein the future visibility information for each future location of the plurality of future locations corresponds to a second time during which visibility of the driving environment is likely to change, and wherein the second time for each future location is a respective amount of time later than the first time;

determining, by the hardware processor based on the future visibility information, whether a point of sufficient visibility (PSV) exists among the plurality of future locations, wherein the PSV is identified, from among the plurality of future locations, as a first future location along the trajectory of the AV that is a point determined to be clear of occlusions with respect to a speculative object; and controlling, by the hardware processor, operation of the AV based on the PSV determined to exist among the plurality of future locations.

9. The method of claim 8, wherein the set of objects comprises a set of permanent objects within the driving environment and a set of perception objects observed by the AV within the driving environment.

10. The method of claim 9, wherein obtaining the set of input data comprises obtaining a surfel map corresponding to the set of permanent objects.

11. The method of claim 8, wherein determining, based on the future visibility information, whether the PSV exists among the plurality of future locations further comprises:

identifying a region of interest (ROI) with respect to a viewpoint of the AV;

determining, based on the ROI, a set of future visibilities associated with the plurality of future locations, wherein each future location of the plurality of future locations corresponds to a respective future visibility of the set of future visibilities; and determining whether the PSV exists within the plurality of future locations based on the set of future visibilities.

12. The method of claim 11, wherein determining the set of future visibilities further comprises determining, for each future location of the plurality of future locations, whether the ROI is occluded using raycasting by:

identifying a number of occluded rays that exist with respect to the ROI;

determining whether the number of occluded rays satisfies a threshold condition; and in response to determining that the number of occluded rays satisfies the threshold condition, identifying the ROI as being occluded.

13. The method of claim 8, wherein controlling operation of the AV based on the PSV further comprises identifying at least one of: a yield location, a distance to the PSV, or a time to the PSV.

14. The method of claim 8, further comprising, in response to determining that the PSV does not exist among the plurality of future locations, using, by the hardware processor, a set of default settings to control operation of the AV.

15. A non-transitory computer-readable storage medium having instructions stored thereon that, when executed by a hardware processor, cause the hardware processor to perform operations comprising:

obtaining a set of input data representing a set of objects within a driving environment being navigated by an autonomous vehicle (AV), the set of input data being associated with a first time;

generating, based on the set of input data associated with the first time, future visibility information for a plurality of future locations along a trajectory of the AV within the driving environment, wherein the future visibility information for each future location of the plurality of future locations corresponds to a second time during which visibility of the driving environment is likely to change, and wherein the second time for each future location is a respective amount of time later than the first time;

determining, based on the future visibility information, whether a point of sufficient visibility (PSV) exists among the plurality of future locations, wherein the PSV is identified, from among the plurality of future locations, as a first future location along the trajectory of the AV that is determined to be clear of occlusions with respect to a speculative object; and controlling operation of the AV based on the PSV determined to exist among the plurality of future locations.

16. The non-transitory computer-readable storage medium of claim 15, wherein the set of objects comprises a set of permanent objects within the driving environment and a set of perception objects observed by the AV within the driving environment, and wherein obtaining the set of input data comprises obtaining a surfel map corresponding to the set of permanent objects.

17. The non-transitory computer-readable storage medium of claim 15, wherein determining, based on the future visibility information, whether the PSV exists among the plurality of future locations further comprises:

identifying a region of interest (ROI) with respect to a viewpoint of the AV;

determining, based on the ROI, a set of future visibilities associated with the plurality of future locations, wherein each future location of the plurality of future locations corresponds to a respective future visibility of the set of future visibilities; and determining whether the PSV exists within the plurality of future locations based on the set of future visibilities.

18. The non-transitory computer-readable storage medium of claim 17, wherein determining the set of future visibilities further comprises determining, for each future location of the plurality of future locations, whether the ROI is occluded using raycasting by:

identifying a number of occluded rays that exist with respect to the ROI;

determining whether the number of occluded rays satisfies a threshold condition; and in response to determining that the number of occluded rays satisfies the threshold condition, identifying the ROI as being occluded.

19. The non-transitory computer-readable storage medium of claim 15, wherein controlling operation of the AV based on the PSV further comprises identifying at least one of: a yield location, a distance to the PSV, or a time to the PSV.

20. The non-transitory computer-readable storage medium of claim 15, wherein the operations further comprise, in response to determining that the PSV does not exist among the plurality of future locations, using a set of default settings to control operation of the AV.

* * * * *